United States Patent
Parikh et al.

(10) Patent No.: US 11,245,254 B2
(45) Date of Patent: Feb. 8, 2022

(54) METHOD FOR PHASE CONTROLLED ENERGIZING OF POWER TRANSFORMER

(71) Applicant: Hitachi Energy Switzerland AG, Baden (CH)

(72) Inventors: Urmil Parikh, Vadodara (IN); Michael Stanek, Gebenstorf (CH)

(73) Assignee: Hitachi Energy Switzerland AG, Baden (CH)

( * ) Notice: Subject to any disclaimer, the term of this patent is extended or adjusted under 35 U.S.C. 154(b) by 0 days.

(21) Appl. No.: 16/327,809

(22) PCT Filed: Aug. 23, 2016

(86) PCT No.: PCT/IB2016/055026
§ 371 (c)(1),
(2) Date: Feb. 22, 2019

(87) PCT Pub. No.: WO2018/037262
PCT Pub. Date: Mar. 1, 2018

(65) Prior Publication Data
US 2019/0190254 A1    Jun. 20, 2019

(51) Int. Cl.
*H02H 9/00* (2006.01)
*H01H 9/56* (2006.01)
*H01F 27/42* (2006.01)
*H02H 1/00* (2006.01)
(Continued)

(52) U.S. Cl.
CPC ............ *H02H 9/002* (2013.01); *H01F 27/42* (2013.01); *H01H 9/56* (2013.01); *H02H 1/0092* (2013.01); *H02H 7/04* (2013.01); *H02H 3/06* (2013.01)

(58) Field of Classification Search
CPC ... H02H 9/00; H02H 7/00; H02H 3/00; H01F 27/00; H01H 9/00
See application file for complete search history.

(56) References Cited

U.S. PATENT DOCUMENTS 8,779,634 B2 * 7/2014 Tsutada ............... H01H 33/593
  307/127
8,878,391 B2   11/2014 Taylor
(Continued)

FOREIGN PATENT DOCUMENTS

CN   101647169 A   2/2010
CN   103238197 A   8/2013
(Continued)

OTHER PUBLICATIONS

Written Opinion from ISA for PCT/IB2016/055026.
(Continued)

*Primary Examiner* — Hal Kaplan
*Assistant Examiner* — Joseph N Inge
(74) *Attorney, Agent, or Firm* — Sage Patent Group (57) ABSTRACT

A method for phase controlled energizing of a power transformer includes acquiring electrical voltage signal from a voltage sensing device connected to the power transformer. Determining a first characterizing data in the voltage signal within a pre-determined set of cycles at about an opening operation of a circuit breaker and determining a second characterizing data within the pre-determined set of cycles in the voltage signal subsequent to the opening operation of the circuit breaker. Estimating a level of magnetization of the core of the power transformer based on at least one of second characterizing data, and the first characterizing data and the second characterizing data. Operating the circuit breaker at a determined instant of switching based on the estimated level of magnetization for a phase controlled energizing of the power transformer by the circuit breaker.

13 Claims, 5 Drawing Sheets

(51) Int. Cl.
*H02H 7/04* (2006.01)
*H02H 3/06* (2006.01)

(56) References Cited

U.S. PATENT DOCUMENTS

| | | | |
|---|---|---|---|
| 2004/0130835 A1* | 7/2004 | Wahlroos | H01H 9/56 361/2 |
| 2013/0208386 A1* | 8/2013 | Kai | H02H 7/0455 361/115 |

FOREIGN PATENT DOCUMENTS

| | | |
|---|---|---|
| EP | 2141780 | 1/2010 |
| EP | 2629314 | 8/2013 |
| JP | 2000275311 A | 10/2000 |
| WO | 2016103228 | 6/2016 |

OTHER PUBLICATIONS

International Search Report for PCT/IB2016/055026.
International Preliminary Report on Patentability for PCT/IB2016/055026.
Indian Examination Report dated Aug. 28, 2020 for Indian Patent Application No. 201641018701, 6 pages.
Office Action dated Sep. 24, 2019 for Chinese Patent Application No. 201680088685.7, 16 pages.
Japanese Notice of Reasons for Refusal dated Jul. 31, 2020 for Japanese Patent Application No. 2019-510846, 8 pages (including English translation).

* cited by examiner

METHOD FOR PHASE CONTROLLED ENERGIZING OF POWER TRANSFORMER

CROSS-REFERENCE TO RELATED APPLICATIONS

This application is a national stage application under 35 U.S.C. § 371, and claims the benefit, of International Filing No. PCT/IB2016/055026, filed on Aug. 23, 2016, the disclosure of which is hereby incorporated by reference in the entirety.

FIELD OF THE INVENTION

The present invention generally relates to energizing of a power transformer and more specifically relates to phase controlled energizing of a power transformer.

BACKGROUND

In a power system, when a power transformer is energized a transient current may be drawn initially by the power transformer. This transient current drawn initially by the power transformer is also known as an inrush current. The inrush current lasts for a short duration however it can cause damage to power systems due to its high magnitude. One reason for inrush current relates with magnetization of the core of the power transformer. Due to magnetic properties of the core of the power transformers even after de-energization of the power transformers, some amount of magnetic flux may remain in the power transformer core, which is known as the residual flux, and contribute to inrush current during energization of the power transformer. The inrush current can be reduced to certain extent if residual flux levels are considered during energization operation of the power transformer.

There are various methods to reduce inrush currents taking into account the effect of residual flux in the core of a power transformer. For example, one such method is through controlled de-energization followed by controlled energization of power transformer known as residual flux locking method. Another method is based on residual flux estimation and energizing considering residual flux effect during next energization of power transformer. In later method, the success level for reducing inrush current depends on energizing the transformer with same level of residual flux which was locked during previous controlled de-energization for first method. On the other hand, for the later method, success level depends upon the effective estimation of residual flux in the core of the power transformer and utilization of this information for controlled energization of power transformers. However, effective estimation of residual flux in the power transformer is a challenge as the residual flux level (residual flux magnitude) depends on the condition at de-energization (e.g. switching off instant with respect to instantaneous value of applied voltage/current in each phase of power transformer) and also that the residual flux magnitude in the core of the transformer can change with time due to magnetic properties of power transformer, its interplay with other components of the transformer, environment of the transformer (e.g. temperature conditions) and with components connected with the transformer (circuit breakers, load etc.).

Hence there is a need for a method for controlled energizing of power transformer to avoid excessive inrush current especially in a scenario where the residual flux level undergoes a change subsequent to a de-energization operation.

SUMMARY

The above-mentioned shortcomings, disadvantages and problems are addressed herein which will be understood by reading and understanding the following specification.

In one aspect, the present invention provides a method for phase controlled energizing of power transformers in an electrical system. The power transformer is connected to a circuit breaker operated by a controller for performing controlled switching. The circuit breaker is connected between at least one phase of a power source and a winding of the power transformer. The method comprising, acquiring electrical voltage signal from a voltage sensing device connected to the power transformer, determining a first characterizing data in the acquired electrical voltage signal within a pre-determined set of cycles, wherein the first characterizing data represents an aspect characteristic to the acquired electrical voltage signal within the pre-determined set of cycle at about the opening operation of the circuit breaker, determining a second characterizing data within the pre-determined set of cycles in the acquired electrical voltage signal subsequent to an opening operation of the circuit breaker, wherein the second characterizing data represents an aspect characteristic to the acquired electrical voltage signal within the pre-determined set of cycle subsequent to the opening operation of the circuit breaker, estimating a level of magnetization of core of the power transformer based on at least one of second characterizing data, and the first characterizing data and the second characterizing data, determining an instant of switching in at least one phase of the power source based on the estimated level of magnetization; and operating the circuit breaker at the determined instant of switching for a phase controlled energizing of the power transformer.

In another aspect the present invention discloses a controller configured to operate at least one circuit breaker connected between a power transformer and at least one phase of a power source. The controller comprising one or more processors configured to, acquire electrical voltage signal from a voltage sensing device connected to the power transformer, determine a first characterizing data in the acquired electrical voltage signal within a pre-determined set of cycles, wherein the first characterizing data represents an aspect characteristic to the acquired electrical voltage signal within the pre-determined set of cycle at about the opening operation of the circuit breaker; determine a second characterizing data within the pre-determined set of cycles in the acquired electrical voltage signal subsequent to an opening operation of the circuit breaker, wherein the second characterizing data represents an aspect characteristic to the acquired electrical voltage signal within the pre-determined set of cycle subsequent to the opening operation of the circuit breaker; estimate a level of magnetization of core of the power transformer based on at least one of second characterizing data, and the first characterizing data and the second characterizing data; determine an instant of switching in at least one phase of the power source based on the estimated level of magnetization; and operating the circuit breaker at the determined instant of switching for a phase controlled energizing of the power transformer.

DETAILED DESCRIPTION

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be utilized. The following detailed description is, therefore, not to be taken in a limiting sense.

Figure 1:
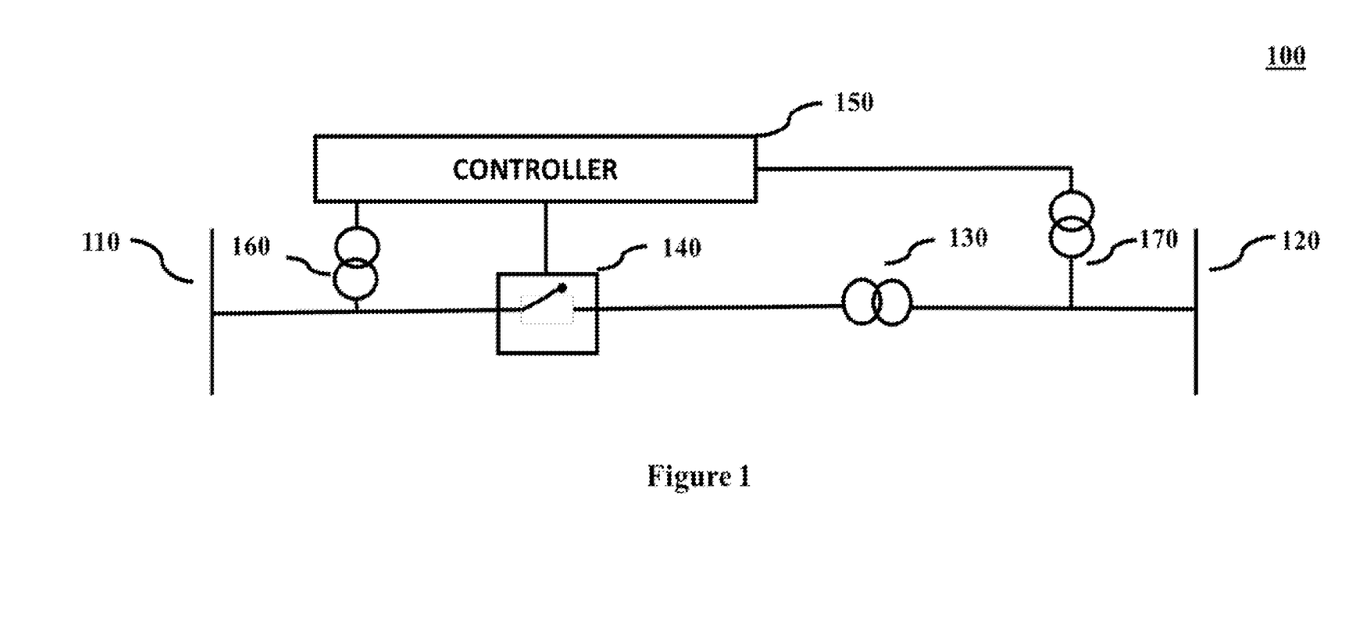
FIG. 1 illustrates a single line representation of a system for phase controlled energizing of a power transformer in accordance with various embodiments of the present invention.

FIG. 1 illustrates a system 100 for phase controlled energizing of a power transformer 130. The system 100 includes a power transformer 130 and may include any system component that take part in transmission of electricity, a circuit breaker 140, a power source 110 (in the figure represented as a bus 110 to indicate the power transformer 130 is supplied from the bus or a subsystem), suitable voltage sensing devices 160 and 170 and a controller 150. The voltage sensing devices used can be potential transformers or resistive dividers or capacitive dividers or capacitor voltage transformer (CVT) or other non-conventional voltage sensors like optical voltage sensors. It is to be noted that the frequency response of these voltage sensing devices are different, e.g. the potential transformer and the capacitive dividers work are suitable for measurement of oscillating voltage (AC voltage) and can have bandwidth specification to accurately measure the voltage signal. The resistive divider is suitable for AC/DC voltage measurements and can measure high frequency signals. The power transformer 130 is shown to be connected to source side subsystem (power source 110) and to a load side subsystem 120. A circuit breaker 140 is provided between the power source 110 and the power transformer 130 for controlled energization of the power transformer 130 and for protection and isolation of the power transformer 130 from the power source 110 during fault. At the load side of the power transformer 130, at least one another circuit breaker (not shown) can be provided to isolate the transformer from being connected to the load or to the load side subsystem 120. Also, it may be noted by a person skilled in the art that the voltage sensing device 170 may be connected between the circuit breaker 140 and the power transformer 130. Alternately, the voltage sensing device 170 may also be connected between power transformer 130 and the load side subsystem 120 as illustrated in FIG. 1.

It is to be noted by a person skilled in the art that the load side subsystem 120 mentioned herein can include electrical elements and devices such as transmission lines, power transformers, capacitor banks, shunt reactors, motor loads, etc., which are capable of drawing power from the first power source 110. Additionally, it is to be noted by a person skilled in the art that the power transformer 130 can include one or more phases with multiple windings wherein the multiple windings maybe connected to multiple circuit breakers. The windings of the power transformer 130 can be connected in any known connection configuration for example, delta, and star, interconnected star and any other combination thereof. For the purpose of this disclosure, the term power transformer would broadly cover other types of transformer like zigzag or phase shifting or auto transformer, and hence the term power transformer is not to be taken in a limiting sense.

Additionally, it is to be noted that communication of voltage measurement from the potential transformer 160, potential transformer 170, to the controller 150 can be performed in a plurality of ways using networks and corresponding network configurations known to the person skilled in art. Similarly, it is to be noted by a person skilled in the art that while FIG. 1 discloses the circuit breaker 140, similar switching devices can also be used in place of the circuit breaker 140. Additionally, it is to be noted by a person skilled in the art that controller 150 have been used for controlling the operation of the circuit breaker 140, various other control philosophies known could be used for controlling circuit breakers.

The circuit breaker 140 can perform a closing operation to establish electrical connection between the power source 110 and the power transformer 130 and an opening operation to interrupt the electrical connection between the power source 110 and the power transformer 130. The closing operation and opening operation are herein generally referred also as a switching operation. The closing operation and opening operation are generally performed in a phase controlled manner (for example, operated at a particular phase instant or phase angle with reference to the applied voltage) for energization and de-energization of the power transformer 130 and thus performed in a controlled fashion.

Opening and closing of the circuit breaker 140 is controlled with an electronic controller 150. The controller 150 is also referred to as an intelligent electronic device 150. The controller 150 determines appropriate switching instances for operating the circuit breaker 140 to ensure minimal electrical disturbance in the electrical system 100, and to ensure that electrical and mechanical shock generated while switching are minimal. The controller 150 while operating the circuit breaker at desired switching instances takes into account the circuit breaker operating time (opening and closing actuation time of the circuit breaker). The controller 150 is configured to receive information relating to the applied voltage (power source voltage) to the power transformer 130 and power transformer output from respective voltage sensing devices such as potential transformers 160 and 170. The controller 150 includes one or more processors and input and output peripherals (I/O blocks) for receiving signals from the potential transformers, sending actuating signals to the circuit breaker 140, for computation and estimation of instants for switching (also known as time for switching or switching angle) in consideration of the bus voltage (at least one phase of the bus voltage applied to the power transformer 130), a memory module functionally coupled to the one or more processors for storing information required for estimation and correction of the instant for switching, and a network interface capable of communicating over a communication channel.

The one or more processors of the controller 150 are configured to estimate a level of magnetization using the acquired electrical voltage signal from the voltage sensing device 160 connected to the power transformer 130. In an embodiment of the invention, the level of magnetization (level of residual magnetic flux) is estimated after de-energization of the power transformer 130 i.e. after opening of the circuit breaker 140 to isolate the power transformer 130 from the power source 110 and opening of another circuit breaker (not shown) to isolate the power transformer 130 from the load side subsystem 120. In another embodiment, for a multiple winding power transformer 130 connected to the load side subsystem 120 through multiple circuit breakers, the level of magnetization is estimated subsequent to an opening operation of a last circuit breaker that isolates the power transformer 130 from the load side subsystem 120. The residual magnetic flux (magnetization level) can be estimated with processing of the measured voltage signal from the potential transformer 160 obtained immediately after de-energization of the power transformer 130 by opening of the circuit breaker 140. Considering the interplay of the energy stored in the magnetic components (mainly the magnetic core) within the power transformer 130 with the other components (e.g. capacitive elements) of the power transformer 130 or/and the circuit breakers connected with the power transformer 130 (also any load connected in any manner to the windings of the power transformer), and interaction with the environment conditions (e.g. temperature) around the magnetic components due to the magnetic properties of the core of the power transformer 130, the average value of residual magnetic flux is expected to change with time (the voltage signal measured at the winding terminals of the transformer can be oscillating due to the interplay).

The change in the level of the residual magnetic flux over a period of time can be estimated by determining a characterizing data of the acquired voltage signal in at least two instances or at least two period of time (for a predetermined set of cycles). The characterizing data can be any aspect indicative of a profile of the acquired voltage signal in an instant/period of time. The characterizing data represents an aspect characteristic to the acquired electrical voltage signal within a pre-determined set of cycle for example the characterizing data can be form factor, co-efficient of Fast Fourier transform, the acquired signal waveform (pattern) itself, a voltage signal time period value, an area under a curve of the acquired voltage signal, a peak value of the acquired voltage signal, a Root Mean Square value of the acquired voltage signal and the like. To further elaborate, the characterizing data can be a measurement at a particular phase of the acquired voltage signal or a peak (positive/negative) of the measured oscillating signal or a processed value (e.g. root mean square value, area under the curve of the oscillating signal) derived from the measured oscillating signal or a time period for a particular set of cycles in the measured oscillating signal or the acquired voltage signal over a period of time (signal waveform/pattern).

For reference, an instance or period of time within a pre-determined set of cycles in the acquired voltage signal about the opening operation of the circuit breaker can be used. The second instance of the at least two instances is the instance to determine a second characterizing data within the pre-determined set of cycles in the acquired electrical voltage signal subsequent to an opening operation of the circuit breaker 140. The choice of second characterizing data need to correspond with the first characterizing data to allow comparison to determine an estimate of the change in the residual magnetic flux. For example, if a positive peak value is used as the first characterizing data of the oscillating signal acquired at the first instance then the second characterizing data correspondingly is also determined with the positive peak value of the oscillating signal at around the second instance.

Another example, if a characterizing data is the waveform pattern of the acquired voltage signal, the first and the second characterizing data can be compared to estimate the change in the level of residual flux. In yet another example, shape related aspect of the waveform pattern of the acquired voltage signal can be used to estimate the level of residual flux after de-energization of the power transformer 130. Here, the second characterizing data is the waveform pattern of the acquired voltage signal and the shape related aspect can be associated with the level of residual flux. This association can be implemented by any mathematical process, for example using statistical method, artificial neural network or any such methods known in the art for pattern recognition. Herein for the sake of simplicity, examples for determining the level of magnetization are categorized into/associated with three levels of magnetization viz., a no demagnetization case, a full demagnetization case and a partial demagnetization case. For example, in a full de-magnetization case the estimate of level of magnetization is considered as zero, in a no demagnetization case the estimate of level of magnetization is considered to be same as for a previous locked in level of magnetization, for a partial de-magnetization case the estimate of level of magnetization is considered to be a non-zero value. The previous locked in level of magnetization is the level of residual flux determined in the core of the power transformer 130 during a previous de-energization operation of the power transformer 130.

In an embodiment, a magnitude of the waveform acquired subsequent to opening of the circuit breaker (second characterizing data) can be normalized in comparison with the waveform acquired immediately before opening of the circuit breaker (first characterizing data). The normalized data for the second characterizing data is used as an input to a trained artificial neural network wherein the normalized second characterizing data is categorized into at least one of the three levels of magnetization.

The controller 150 determines an instant of switching of the circuit breaker 140 in at least one phase of the power source 110 or at least one phase angle of the applied voltage signal based on the estimated level of magnetization based on the second characterizing data and the first characterizing data determined from the acquired electrical voltage signal (measured voltage signal) and operates the circuit breaker 140 at the determined instant of switching for a phase controlled energizing of the power transformer 130.

Figure 2:
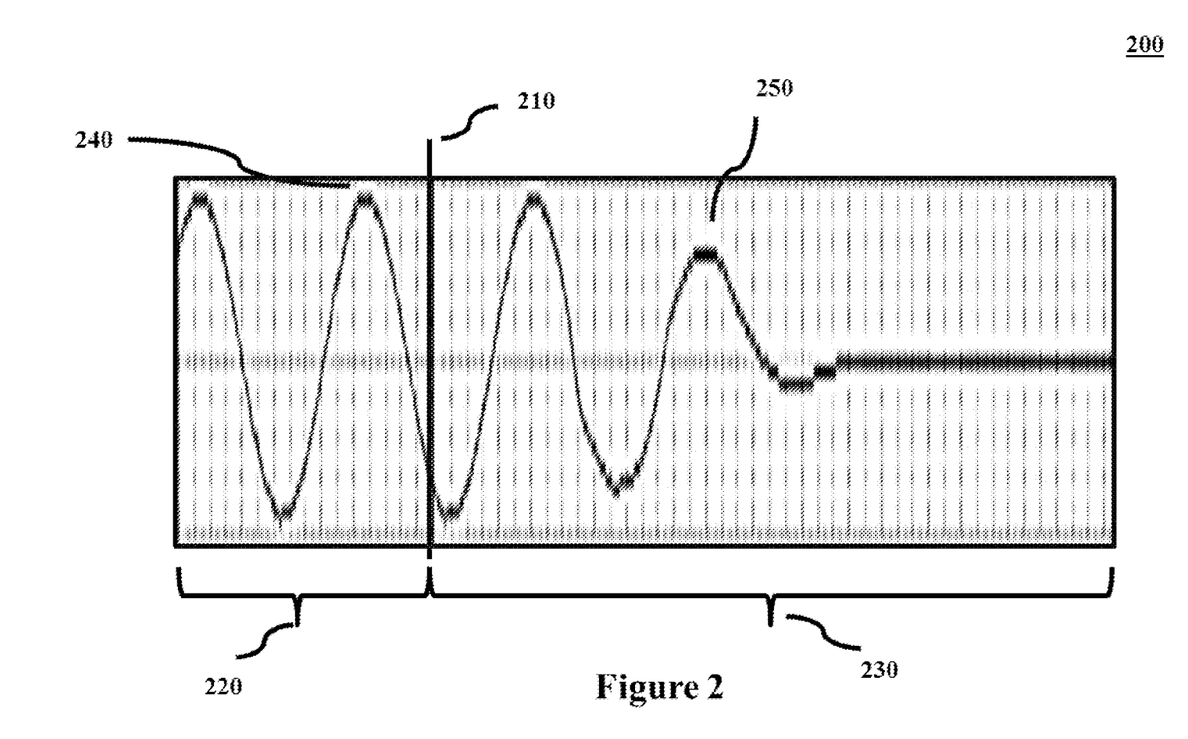
FIG. 2 illustrates an exemplary acquired voltage signal representing voltage across a power transformer depicting no-demagnetization of the core of the power transformer.

FIG. 2, illustrates an acquired voltage signal 200 representing voltage across a power transformer 130 during an energized and de-energized state of the power transformer 130 when there is no de-magnetization of the core of the transformer. The acquired voltage signal 200 indicate non-sustained oscillations and absence of any capacitive element in the system. The acquired voltage signal 200 illustrates a voltage waveform wherein subsequent to an instant of de-energization 210 there is an exponential decay of the voltage waveform with no sustained oscillations. At 200, the voltage oscillations about an instant of de-energization and an instant subsequent to the instant of de-energization are depicted where a point of de-energization 210 is marked to distinguish between the voltage oscillations before de-energization 220 and the voltage oscillations after de-energization 230. For exemplary purposes, only a few set of cycles from the acquired voltage signal are being depicted herein at FIG. 2. At the instant 210 the power transformer 130 is de-energized, and hence the voltage signal oscillates for a few cycles after a de-energization operation, further to which the voltage signal depicts a decaying nature. At 200, the acquired voltage signal is shown to follow a decaying trend with a lowering in magnitude of the acquired voltage signal until it reaches around level zero. The decay is of an exponential nature with non-observance of any sustained voltage oscillations. A peak value on the acquired electrical voltage signal for instance 240 is taken to be a first characterizing data of the acquired voltage signal. After the instant, 210 when de-energization takes place, the signal will continue in its same form for a few cycles subsequent to which the signal will begin to lower in magnitude. For example after two set of cycles the magnitude begins to reduce. A second peak value (second characterizing data) is determined after the de-energization of the power transformer 130, for example the value represented by a point 250 in FIG. 2. Comparing these two characterizing values, i.e., the first characterizing value and the second characterizing value, and determining a difference between the two values, it may be considered that there is a change in the level of magnitude of the signal from a point before de-energization to a point subsequent to de-energization. Based on this difference, a level of magnetization (a level of magnetic residual flux) in the core of the power transformer 130 is estimated based on which an instant of switching is calculated in at least one phase of the power source 110. Finally, a circuit breaker 140 is operated at the determined instant of switching for a phase controlled energization of the power transformer 130. In an exemplary embodiment, with reference to FIG. 2, the waveform pattern of the acquired voltage signal about the instant of de-energization (first characterizing data) is determined and the waveform pattern of the acquired voltage signal subsequent to an instant of de-energization (second characterizing data) is determined. The second characterizing data is the waveform pattern of the acquired voltage signal and the shape related aspect of the waveform pattern can be associated with the level of residual flux. The second characterizing data is used as an input to a trained Artificial Neural Network wherein the level of magnetization are categorized into/associated with three levels of magnetization viz., a no demagnetization case, a full demagnetization case and a partial demagnetization case. In this exemplary scenario with reference to FIG. 2, which is a no demagnetization case the estimate of level of magnetization is considered to be same as for a previous locked in level of magnetization. The previous locked in level of magnetization is the level of residual flux estimated in the core of the power transformer 130 during a previous de-energization operation of the power transformer 130. Finally, the controller 150 determines an instant of switching of the circuit breaker 140 in at least one phase of the power source 110 or at least one phase angle of the applied voltage signal based on the estimated level of magnetization.

Figure 3:
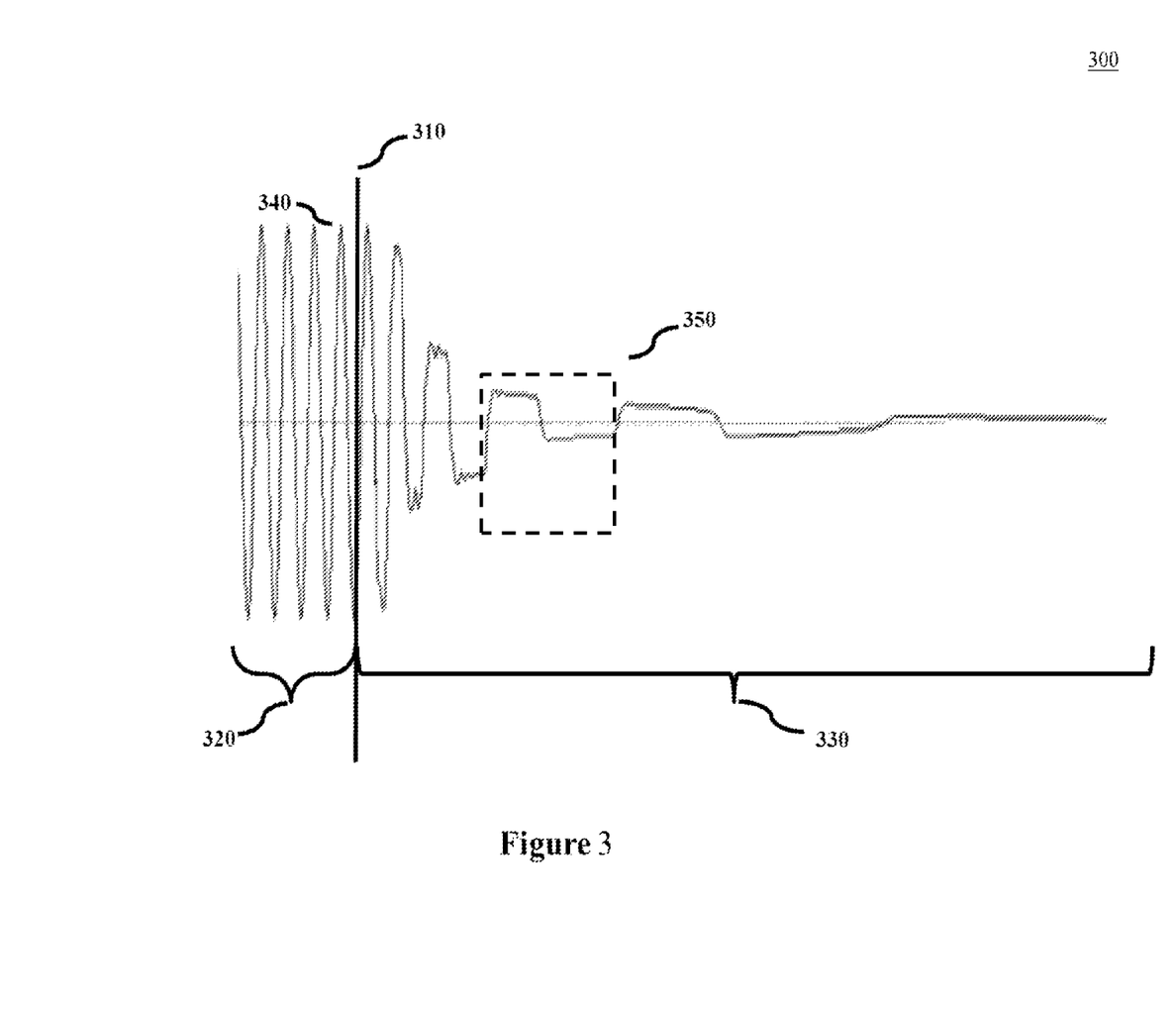
FIG. 3 illustrates an acquired voltage signal representing voltage across a power transformer depicting full demagnetization of the core of the power transformer.

FIG. 3, illustrates an acquired voltage signal 300 representing voltage across a power transformer 130 during an energized and de-energized state of the power transformer 130 when there is full de-magnetization of the core of the transformer in the presence of capacitive element in the system. The acquired voltage signal 300 indicate sustained voltage oscillations due to presence of capacitive element in the system. The acquired voltage signal 300 illustrates a voltage waveform wherein subsequent to an instant of de-energization 310 there is no exponential decay of the voltage waveform and instead sustained oscillations occur. At 300, the voltage oscillations about an instant of de-energization and an instant subsequent to the instant of de-energization are depicted where a point of de-energization 310 is marked to distinguish between the voltage oscillations before de-energization 320 and the voltage oscillations after de-energization 330. For exemplary purposes, only a few set of cycles from the acquired voltage signal are being depicted herein at FIG. 3. At the instant 310 the power transformer 130 is de-energized, and hence the voltage signal oscillates for a few cycles after a de-energization operation, further to which the voltage signal exhibits certain characteristic behavior. Subsequent to the point of de-energization at 310 the signal can exhibit any or all of the characteristics like decrease in magnitude, increase in time period and equal and opposite polarity for at least one cycle of the acquired voltage signal, as illustrated at 350. Further, as illustrated in FIG. 3, at 350 in comparison with 340, the acquired voltage signal on de-energization exhibits a change in the shape of the signal from a sinusoidal form to a square wave or irregularly shaped form while maintaining the change in characteristic in relation to decrease in magnitude, increase in time period and equal and opposite polarity for at least one cycle of the acquired voltage signal.

In an exemplary embodiment, with reference to FIG. 3, the waveform pattern of the acquired voltage signal about the instant of de-energization (first characterizing data) is determined and the waveform pattern of the acquired voltage signal subsequent to an instant of de-energization (second characterizing data) is determined. The second characterizing data is the waveform pattern of the acquired voltage signal as indicated in 350 and the shape related aspect of the waveform pattern can be associated with the level of residual flux. The second characterizing data 350 is used as an input to a trained Artificial Neural Network wherein the level of magnetization are categorized into/associated with three levels of magnetization viz., a no demagnetization case, a full demagnetization case and a partial demagnetization case. In this exemplary scenario with reference to FIG. 3, which is a full demagnetization case the estimate of level of magnetization is considered to be zero. Finally, the controller 150 determines an instant of switching of the circuit breaker 140 in at least one phase of the power source 110 or at least one phase angle of the applied voltage signal based on the estimated level of magnetization.

Figure 4:
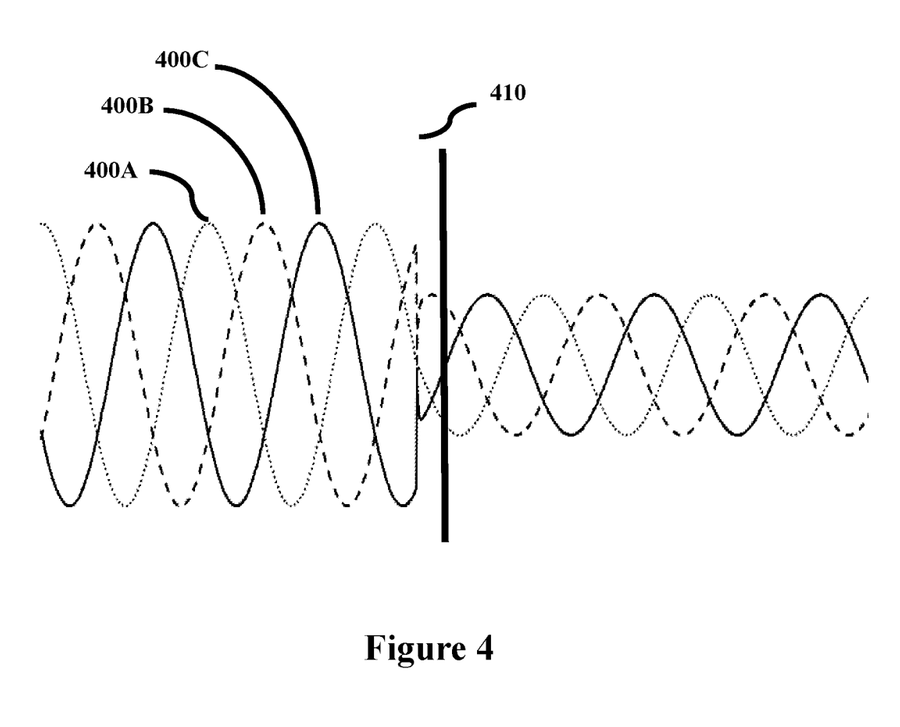
FIG. 4 illustrates acquired voltage signal in three-phases representing voltage across a three-phase power transformer depicting partial demagnetization of the core of the power transformer.

In an embodiment, the circuit breaker 140 can be provided with any equipment with substantial value of capacitance for example a grading capacitor. The acquired voltage signal for this embodiment with grading capacitor is illustrated in FIG. 4. FIG. 4 illustrates an acquired voltage signal for a three-phase power transformer for an embodiment wherein the circuit breaker 140 used for energization and de-energization of the power transformer 130 is provided with a grading capacitor. FIG. 4 is illustrated using an embodiment wherein the power transformer 130 is a three-phase power transformer and hence the acquired voltage signal is depicted in a three-phase manner with acquired electrical voltage signals 400A, 400B and 400C. In such an embodiment, part of the applied voltage or source voltage from the power source 110 shall be transferred to the power transformer 130 during de-energization of the power transformer 130. And the acquired voltage signal after the de-energization of the power transformer 130 at 410 will depict a sustained oscillation probably with a lower magnitude in comparison to the magnitude of the acquired voltage prior to the instant of de-energization. The acquired voltage signal subsequent to an instant of de-energization at 410, exhibits symmetric and periodic waves with reduced magnitude in comparison to the nature of the wave before the instant 410. Unlike FIG. 3, in FIG. 4 the pattern of the acquired voltage signal before and after an instant of de-energization is maintained, for example sinusoidal pattern. For an acquired voltage signal 400A, a peak value at any instant about the time of de-energization is determined (first characterizing value) and a peak value at any instant subsequent to the de-energization operation at 410 is determined (second characterizing value). Comparing these two characterizing values, i.e., the first characterizing value and the second characterizing value, and determining a difference between the two values, it may be considered that there is a change in the level of magnitude of the signal from a point before de-energization to a point subsequent to de-energization. Based on this difference, a level of magnetization (a level of magnetic residual flux) in the core of the power transformer 130 is estimated based on which an instant of switching is calculated in at least one phase of the power source 110. Finally, a circuit breaker 140 is operated at the determined instant of switching for a phase controlled energization of the power transformer 130.

For the exemplary embodiment where the level of magnetization (residual flux level) is considered fixed in a system for phase controlled energization of power transformer 130 and the circuit breaker 140 is operated at the instant of switching with respect to this fixed level of residual flux, in such a scenario, the fixed level of residual flux (level of magnetization) can be corrected or adjusted based on the change detected in the acquired voltage signal after an instant of de-energization. Referring to FIG. 4, where the acquired electrical voltage signals 400A, 400B and 400C represent sustained oscillations with lowering of magnitude, the fixed level of magnetization (residual flux) can be corrected to a non-zero value, e.g., 10% of the peak value, or reduce the pre-determined level of magnetization (residual flux) relative to the considered fixed value, e.g. by −40%. Consequently, a phase controlled energization of power transformer 130 is performed based on the corrected level of magnetization.

In another exemplary embodiment, with reference to FIG. 4, the waveform pattern of the acquired voltage signal about the instant of de-energization (first characterizing data) is determined and the waveform pattern of the acquired voltage signal subsequent to an instant of de-energization (second characterizing data) is determined. The second characterizing data is the waveform pattern of the acquired voltage signal and the shape related aspect of the waveform pattern can be associated with the level of residual flux. The second characterizing data is used as an input to a trained Artificial Neural Network wherein the level of magnetization are categorized into/associated with the three levels of magnetization and with reference to FIG. 4, which is a partial demagnetization case the estimate of level of magnetization is considered to be a non-zero value. Finally, the controller 150 determines an instant of switching of the circuit breaker 140 in at least one phase of the power source 110 or at least one phase angle of the applied voltage signal based on the estimated level of magnetization.

Figure 5:
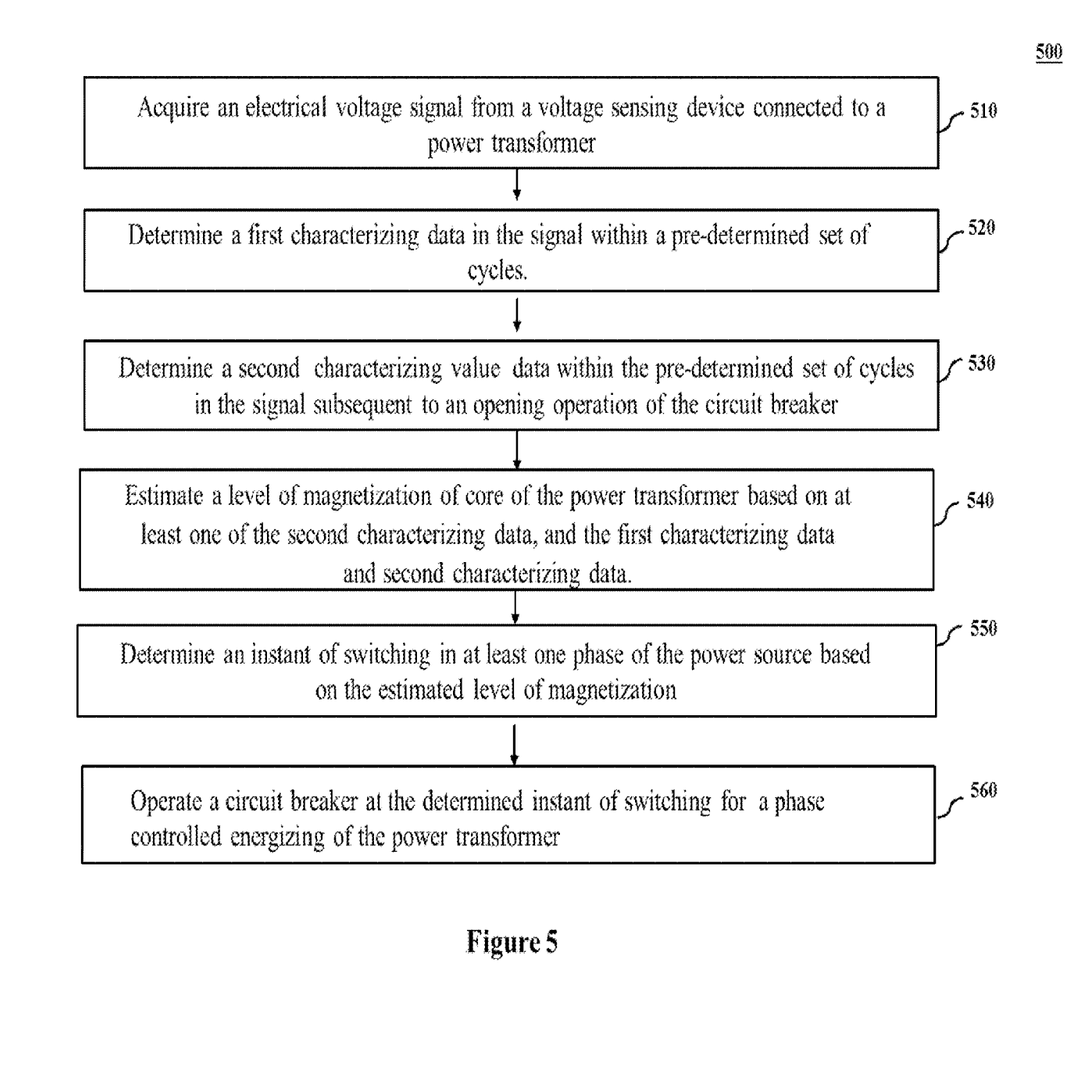
FIG. 5 is a flowchart of a method for phase controlled energizing of a power transformer, in accordance with an embodiment of the present invention.

FIG. 5 depicts a method 500 for phase controlled energizing of the power transformer 130 through the circuit breaker 140.

In the method 500, the controller 150 acquires an electrical voltage signal from a voltage sensing device 170 connected to the power transformer 130 as depicted in 510. The data acquisition can be through an I/O module or through a communication in a communication network between the controller 150 and the voltage sensing device 170.

The controller 150 then determines a first characterizing data in the acquired electrical voltage signal within a pre-determined set of cycles as depicted in 520. The characterizing data represents an aspect characteristic to the acquired electrical voltage signal within the pre-determined set of cycle at about the opening operation of the circuit breaker. The characterizing data can be a at least one of a form factor of the acquired voltage signal, co-efficient of Fast Fourier transform of the acquired voltage signal, the acquired signal waveform (pattern) itself, a voltage signal time period value, an area under a curve of the acquired voltage signal, a peak value of the acquired voltage signal, a Root Mean Square value of the acquired voltage signal, a measurement at a particular phase of the acquired electrical signal and a processed value derived from the electrical voltage signal.

The controller 150 determines a second characterizing data within the pre-determined set of cycles in the acquired electrical voltage signal subsequent to an opening operation of the circuit breaker 140 as depicted in 530. The second characterizing data represents an aspect characteristic to the acquired electrical voltage signal within the pre-determined set of cycles subsequent to an opening operation of the circuit breaker. As mentioned already, the second characterizing data needs to correspond with the first characterizing data to allow comparison to determine an estimate of the change in the residual magnetic flux. Further, the difference between the first characterizing data and the second characterizing data allows determination of de-energization operation of the power transformer 130. As depicted in step 540, a level of magnetization of core of the power transformer 130 is estimated based on at least one of second characterizing data, and the first characterizing data and the second characterizing data. The level of magnetization represents the level of residual flux that is present in core of the power transformer 130 after an opening operation of the circuit breaker 140. When the estimation is based on the second characterizing data for instance when the second characterizing data is a pattern of a waveform, the second characterizing data is used as an input to a trained Artificial Neural Network wherein the level of magnetization are categorized into/associated with three levels of magnetization viz., a no demagnetization case, a full demagnetization case and a partial demagnetization case. The shape related aspect of the pattern of the waveform is associated with the level of residual flux. This association can be implemented by any mathematical process, for example using statistical method, artificial neural network or any such methods known in the art for pattern recognition. The levels of magnetization are categorized into/associated with three levels of magnetization viz., a no demagnetization case, a full demagnetization case and a partial demagnetization case. For example, in a full de-magnetization case the estimate of level of magnetization is considered as zero, in a no demagnetization case the estimate of level of magnetization is considered to be same as for a previous locked in level of magnetization, for a partial de-magnetization case the estimate of level of magnetization is considered to be a non-zero value. When the estimation is based on first characterizing data and the second characterizing data, a comparison between the first characterizing data and the second characterizing data and determining a difference between the two sets of data results in inferring that there is a change in the level of magnitude of the signal from a point before de-energization to a point subsequent to de-energization. Based on this difference, a level of magnetization (a level of magnetic residual flux) in the core of the power transformer 130 is estimated based on which an instant of switching is calculated in at least one phase of the power source 110.

In another exemplary embodiment when characterizing data is the waveform pattern of the acquired voltage signal, the first and the second characterizing data can be compared to estimate the change in the level of residual flux. Here, the difference in the shape of the pattern of the waveform of the two characterizing data can be associated with the level of residual flux. This association can be implemented by any mathematical process, for example using statistical method, artificial neural network or any such methods known in the art for pattern recognition. And the level of magnetization can be categorized into/associated with plurality of levels of magnetization for estimation of the change in level of magnetization.

As depicted in 550, the controller 150 determines an instant of switching in at least one phase of the power source 110 based on the estimated level of magnetization.

The instant of switching in at least one phase of the power source 110 is determined by the controller 150 for performing the closing operation of the circuit breaker 140. The instant of switching is calculated by the controller 150 based on the voltage of the power source 110 measured by the potential transformer 160 to ensure that the flux during the closing operation is equivalent to the level of residual flux left in the power transformer 130 after the opening operation. The level of residual flux in the power transformer 130 is determined based on the level of magnetization of the power transformer 130 as determined in step 550.

As depicted in 560, the controller 150 operates the circuit breaker 140 at the determined instant of switching for a phase controlled energizing of the power transformer 130. It may be noted by a person skilled in the art that while operating the circuit breaker at the determined instant of time the circuit breaker operating time (the time for closing or opening of the circuit breaker) is taken into account. Hence the power transformer is energized at the determined instant of time when the controller operates the circuit breaker at an instant considering the opening and closing time of the circuit breaker for a phase controlled energizing of the power transformer.

Further it may be noted by the person skilled in the art that, the implementation of the mathematical process, for example using statistical method, artificial neural network, look up table or any such methods known in the art for pattern recognition can be done by the controller 150 or by any other device/server (not shown) in the system 100 communicatively connected to the controller 150

It may be noted by a person skilled in the art that the term pre-determined set of cycles, would mean a half a cycle, a full cycle or more than one cycle.

This written description uses examples to describe the subject matter herein, including the best mode, and also to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method for phase controlled energizing of at least one power transformer in an electrical system wherein the power transformer is connected to a circuit breaker operated by a controller for performing controlled switching, the circuit breaker connected between at least one phase of a power source and a winding of the power transformer; the method comprising:
   acquiring an electrical voltage signal from a voltage sensing device connected to the power transformer;
   determining a first characterizing data in the acquired electrical voltage signal within a pre-determined set of cycles, the first characterizing data representative of an aspect characteristic to the acquired electrical voltage signal within the pre-determined set of cycles at about an opening operation of the circuit breaker, the aspect characteristic based on at least one of a shape of a waveform pattern, a co-efficient of Fast Fourier transform, an area under a curve, a peak value, a Root Mean Square value, or a measurement at a particular phase of the electrical voltage signal corresponding to at least a subset of the pre-determined set of cycles;
   determining a second characterizing data within the pre-determined set of cycles in the acquired electrical voltage signal subsequent to the opening operation of the circuit breaker, the second characterizing data representative of the aspect characteristic to the acquired electrical voltage signal within the pre-determined set of cycles subsequent to the opening operation of the circuit breaker;
   estimating a level of magnetization of a core of the power transformer based on a comparison between the first characterizing data and the second characterizing data;
   determining an instant of switching in at least one phase of the power source based on the estimated level of magnetization; and
   operating the circuit breaker at the determined instant of switching for a phase controlled energizing of the power transformer.

2. The method as claimed in claim 1, wherein estimating a level of magnetization comprises categorizing the levels of magnetization into one of a full de-magnetization level, a partial de-magnetization level, or a zero de-magnetization level.

3. The method as claimed as claim 1, wherein categorizing the levels of magnetization is based on a shape related aspect of the second characterizing data.

4. The method as claimed in claim 1, wherein the second characterizing data comprises a waveform pattern of the acquired voltage signal.

5. The method as claimed in claim 1, wherein estimating a level of magnetization of core of the power transformer includes comparing the first and second characterizing data.

6. The method as claimed in claim 1, wherein the second characterizing data is based on at least one of a form factor of the acquired electrical voltage signal, a waveform pattern of the acquired electrical voltage signal, a co-efficient of a Fast Fourier transform of the acquired electrical voltage signal, a time period value derived from the acquired electrical voltage signal, an area under a curve of the acquired electrical voltage signal, a peak value of the acquired electrical voltage signal, a Root Mean Square value of the acquired electrical voltage signal, a measurement at a particular phase of the acquired electrical voltage signal, or a processed value derived from the acquired electrical voltage signal.

7. A controller configured to operate at least one circuit breaker connected between a power transformer and at least one phase of a power source, the controller comprising:
one or more processors configured to:
acquire an electrical voltage signal from a voltage sensing device connected to the power transformer over a time period corresponding to a predetermined set of cycles beginning with an opening operation of the at least one circuit breaker connected between the at least one phase of the power source and a winding of the power transformer;
determine a characteristic of the electrical voltage signal corresponding to the time period, the characteristic based on at least one of a shape of a waveform pattern, a co-efficient of Fast Fourier transform, an area under a curve, a peak value, or a Root Mean Square value of the electrical voltage signal corresponding to at least a subset of the time period;
based on the characteristic, estimate a magnetization level of a core of the power transformer corresponding to the winding;
determine a switching time for at least one phase of the power source based on the estimated magnetization level; and
operate the circuit breaker at the switching time to cause a phase controlled energizing of the power transformer.

8. The controller as claimed in claim 7, wherein the controller is further configured to operate the circuit breaker at a phase angle of at least one phase of the power source wherein the phase angle corresponds to the determined switching time for a phase controlled energizing of the power transformer.

9. The method as claimed in claim 1, wherein the predetermined set of cycles comprises at least two cycles.

10. A method for phase controlled energizing of a power transformer, the method comprising:
acquiring an electrical voltage signal from a voltage sensing device connected to the power transformer over a time period corresponding to a predetermined set of cycles beginning with an opening operation of a circuit breaker connected between at least one phase of a power source and a winding of the power transformer;
determining a characteristic of the electrical voltage signal corresponding to the time period, the characteristic based on at least one of a shape of a waveform pattern, a co-efficient of Fast Fourier transform, an area under a curve, a peak value, a Root Mean Square value, or a measurement at a particular phase of the electrical voltage signal corresponding to at least a subset of the time period;
based on the characteristic, estimating a magnetization level of a core of the power transformer corresponding to the winding;
based on the estimating, determining a switching time for the at least one phase of the power source; and
operating the circuit breaker at the switching time to cause a phase controlled energizing of the power transformer.

11. The method as claimed in claim 10, wherein the estimating include categorizing the magnetization level into one of a full de-magnetization level, a partial de-magnetization level, or a zero de-magnetization level.

12. The method as claimed in claim 10, wherein the characteristic further comprises a phase of the electrical voltage signal corresponding to at least a subset of the time period.

13. The method of claim 10, wherein the predetermined set of cycles comprises at least two cycles.

* * * * *